US011611792B2

(12) United States Patent
Goldberg et al.

(10) Patent No.: US 11,611,792 B2
(45) Date of Patent: *Mar. 21, 2023

(54) ATSC 3 RECEPTION ACROSS BOUNDARY CONDITIONS USING LOCATION DATA

(71) Applicant: Sony Group Corporation, Tokyo (JP)

(72) Inventors: Adam Goldberg, Fairfax, VA (US); Brant Candelore, Poway, CA (US); Graham Clift, Poway, CA (US); Luke Fay, San Diego, CA (US); Fred Ansfield, San Diego, CA (US); Loren F. Pineda, San Diego, CA (US)

(73) Assignee: Sony Group Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/489,732

(22) Filed: Sep. 29, 2021

(65) Prior Publication Data

US 2023/0038596 A1 Feb. 9, 2023

Related U.S. Application Data

(60) Provisional application No. 63/260,021, filed on Aug. 6, 2021.

(51) Int. Cl.
*H04N 21/426* (2011.01)
*H04N 21/61* (2011.01)
(Continued)

(52) U.S. Cl.
CPC ......... *H04N 21/4263* (2013.01); *G06N 20/00* (2019.01); *H04H 60/29* (2013.01); *H04H 60/79* (2013.01); *H04N 21/6106* (2013.01)

(58) Field of Classification Search
CPC .......... H04N 21/4263; H04N 21/6106; H04H 60/29; H04H 60/79; G06N 20/00
See application file for complete search history.

(56) References Cited

U.S. PATENT DOCUMENTS 4,169,226 A * 9/1979 Fukuji ............... H03J 9/06
398/106
4,804,972 A * 2/1989 Schudel ............ H01Q 1/42
343/915

(Continued)

FOREIGN PATENT DOCUMENTS

CN 1941868 B 5/2010
EP 0689307 B1 10/2002
(Continued)

OTHER PUBLICATIONS

"ATSC Standard: A/300:2021, ATSC 3.0 System", Doc. A/300:2021, Jul. 7, 2021.
(Continued)

*Primary Examiner* — Michael B. Pierorazio
(74) *Attorney, Agent, or Firm* — John L. Rogitz

(57) ABSTRACT

Techniques are described for expanding and/or improving the Advanced Television Systems Committee (ATSC) 3.0 television protocol in robustly delivering the next generation broadcast television services. A receiver, to automatically switch from presenting a service on a first frequency to a second frequency such as when a mobile receiver is moving through a boundary region between two broadcasters, can consider not just signal strength and error rates of two frequencies carrying the same service to select which frequency to tune to, but also relative location and direction of motion of the receiver with respect to each broadcaster.

21 Claims, 6 Drawing Sheets

(51) Int. Cl.
*H04H 60/29* (2008.01)
*H04H 60/79* (2008.01)
*G06N 20/00* (2019.01)

(56) References Cited

U.S. PATENT DOCUMENTS

| | | | | |
|---|---|---|---|---|
| 5,528,253 | A * | 6/1996 | Franklin | H01Q 1/427 343/872 |
| 6,023,242 | A * | 2/2000 | Dixon | H01Q 21/065 342/359 |
| 6,072,440 | A * | 6/2000 | Bowman | H01Q 1/42 343/872 |
| 6,538,612 | B1 * | 3/2003 | King | H01Q 1/125 343/765 |
| 6,832,070 | B1 * | 12/2004 | Perry | H04N 21/4782 348/E7.06 |
| 6,904,609 | B1 * | 6/2005 | Pietraszak | H04N 21/26283 725/39 |
| 7,075,492 | B1 * | 7/2006 | Chen | H01Q 19/134 343/781 R |
| 7,076,202 | B1 * | 7/2006 | Billmaier | H04N 21/4334 455/66.1 |
| 7,194,753 | B1 | 3/2007 | Fries et al. | |
| 7,239,274 | B2 * | 7/2007 | Lee | H01Q 1/3275 342/359 |
| 7,472,409 | B1 * | 12/2008 | Linton | H01Q 3/08 343/705 |
| 7,685,621 | B2 * | 3/2010 | Matsuo | H04N 21/4622 725/38 |
| 7,865,930 | B2 | 1/2011 | Kim | |
| 8,290,492 | B2 | 10/2012 | Lu et al. | |
| 8,368,611 | B2 * | 2/2013 | King | H01Q 3/08 725/63 |
| 8,787,237 | B2 | 7/2014 | Väre et al. | |
| 9,548,826 | B2 | 1/2017 | Kitazato et al. | |
| RE46,304 | E | 2/2017 | Kim et al. | |
| 10,904,791 | B2 | 1/2021 | Naik et al. | |
| 10,938,511 | B2 | 3/2021 | Kwak et al. | |
| 10,939,180 | B2 | 3/2021 | Yang et al. | |
| 2003/0051246 | A1 * | 3/2003 | Wilder | H04N 7/17318 348/E7.071 |
| 2003/0214449 | A1 * | 11/2003 | King | H01Q 3/08 343/765 |
| 2004/0128689 | A1 * | 7/2004 | Pugel | H04N 5/50 725/39 |
| 2004/0227655 | A1 * | 11/2004 | King | H01Q 1/3275 341/176 |
| 2005/0108751 | A1 * | 5/2005 | Dacosta | H04N 21/4135 348/E5.103 |
| 2005/0193415 | A1 * | 9/2005 | Ikeda | H04N 21/4586 725/50 |
| 2005/0225495 | A1 * | 10/2005 | King | H01Q 19/132 343/840 |
| 2006/0020978 | A1 * | 1/2006 | Miyagawa | H04B 17/27 725/72 |
| 2006/0139499 | A1 * | 6/2006 | Onomatsu | H04N 21/485 348/731 |
| 2006/0184962 | A1 | 8/2006 | Kendall et al. | |
| 2006/0187117 | A1 * | 8/2006 | Lee | H01Q 1/1257 342/359 |
| 2007/0152897 | A1 * | 7/2007 | Zimmerman | H01Q 1/28 343/757 |
| 2008/0129885 | A1 * | 6/2008 | Yi | H04N 21/4263 348/731 |
| 2008/0186242 | A1 * | 8/2008 | Shuster | H01Q 19/17 343/762 |
| 2008/0186409 | A1 * | 8/2008 | Kang | H04N 21/426 348/731 |
| 2008/0273497 | A1 | 11/2008 | Lu et al. | |
| 2009/0135309 | A1 * | 5/2009 | DeGeorge | H04N 21/4345 348/732 |
| 2009/0260038 | A1 * | 10/2009 | Acton | H04N 21/482 725/49 |
| 2009/0310030 | A1 * | 12/2009 | Litwin | H04N 21/4345 348/731 |
| 2010/0118197 | A1 | 5/2010 | Kim | |
| 2010/0214482 | A1 * | 8/2010 | Kang | H04N 5/50 348/731 |
| 2010/0235858 | A1 | 9/2010 | Muehlbach | |
| 2010/0315307 | A1 * | 12/2010 | Syed | H01Q 17/00 343/872 |
| 2011/0126232 | A1 * | 5/2011 | Lee | H04N 21/6405 707/E17.049 |
| 2012/0133840 | A1 | 5/2012 | Shirasuka et al. | |
| 2013/0207868 | A1 * | 8/2013 | Venghaus | H01Q 19/12 343/840 |
| 2015/0161236 | A1 * | 6/2015 | Beaumont | G06F 16/48 707/736 |
| 2015/0161249 | A1 * | 6/2015 | Knox | G06F 16/337 707/737 |
| 2015/0162897 | A1 | 6/2015 | Zachara | |
| 2015/0189376 | A1 | 7/2015 | Bazata | |
| 2015/0382217 | A1 * | 12/2015 | Odio Vivi | H04B 17/336 370/252 |
| 2016/0014571 | A1 | 1/2016 | Lee et al. | |
| 2016/0173945 | A1 * | 6/2016 | Oh | H04N 21/2362 725/110 |
| 2016/0255394 | A1 * | 9/2016 | Yang | H04N 21/4348 725/131 |
| 2016/0330525 | A1 | 11/2016 | Freeman et al. | |
| 2017/0064528 | A1 * | 3/2017 | Daly | H04W 4/02 |
| 2017/0317408 | A1 * | 11/2017 | Hamada | B62D 25/06 |
| 2017/0318353 | A1 | 11/2017 | Petruzzelli et al. | |
| 2017/0318502 | A1 | 11/2017 | Singh et al. | |
| 2017/0374421 | A1 | 12/2017 | Yim et al. | |
| 2018/0048854 | A1 | 2/2018 | Kwak et al. | |
| 2018/0120169 | A1 * | 5/2018 | Jackson | G06Q 10/00 |
| 2018/0139495 | A1 | 5/2018 | Eyer | |
| 2018/0359541 | A1 * | 12/2018 | Park | G06F 9/54 |
| 2019/0037418 | A1 * | 1/2019 | Gunasekara | H04W 24/02 |
| 2019/0079659 | A1 * | 3/2019 | Adenwala | G06F 3/04842 |
| 2019/0335221 | A1 * | 10/2019 | Walker | H04L 67/04 |
| 2019/0373305 | A1 | 12/2019 | Yang et al. | |
| 2020/0077125 | A1 | 3/2020 | An et al. | |
| 2020/0169775 | A1 | 5/2020 | Clift | |
| 2020/0297955 | A1 * | 9/2020 | Shouldice | G16H 40/63 |
| 2020/0305003 | A1 * | 9/2020 | Landa | H04W 64/003 |
| 2020/0367316 | A1 | 11/2020 | Cili et al. | |
| 2022/0256232 | A1 | 8/2022 | Pesin et al. | |

FOREIGN PATENT DOCUMENTS

| | | |
|---|---|---|
| EP | 2061166 A2 | 5/2009 |
| EP | 2068470 A2 | 6/2009 |
| EP | 2187530 A1 | 5/2010 |
| EP | 3340636 A4 | 1/2019 |
| JP | 2012049853 A | 3/2012 |
| JP | 5372342 B2 | 12/2013 |
| JP | 2020010249 A | 1/2020 |
| KR | 100824606 B1 | 4/2008 |
| KR | 20080069826 A | 7/2008 |
| KR | 1020080069826 A | 7/2008 |
| KR | 20190139454 A | 12/2019 |
| KR | 20210001101 A | 1/2021 |

OTHER PUBLICATIONS

"ATSC Standard: ATSC 3.0 Interactive Content", Doc. A/344:2021, Mar. 23, 2021.
"ATSC Standard: Physical Layer Protocol", Doc. A/322:2021, Jan. 20, 2021.
"ATSC Standard: Signaling, Delivery, Synchronization, and Error Protection", Doc. A/331:2017, Dec. 6, 2017.
"Trinova Boss—Manual", Televes, www.televes.com.
"TV Motion: TriMotion + TriNova Boss", Televes, Jul. 2015.
"TVmotion system", Televes, retrieved on Sep. 8, 2021 from https://www.televes.com/me/g-006-tvmotion-system.html.

(56) References Cited

OTHER PUBLICATIONS

Ahn et al., "ATSC 3.0 for Future Broadcasting: Features and Extensibility", Set International Journal of Broadcast Engineering, 2020 retrieved from https://web.archive.org/web/20201227132053id_/https://set.org.br/jbe/ed6/Artigo2.pdf.

ATSC Standard: Signaling, Delivery, Synchronization, and Error Protection, Doc. A/331:2021, Jan. 19, 2021.

B. Lee, K. Yang, S. -j. Ra and B. Bae, "Implementation of ATSC 3.0 Service Handoff," 2020 International Conference on Information and Communication Technology Convergence (ICTC), 2020, pp. 1429-1432, doi: 10.1109/ICTC49870.2020.9289581.

Clift et al., "Techniques for ATSC 3.0 Broadcast Boundary Area Management Using Complete Service Reception During Scan to Determine Signal Quality of Frequencies Carrying the Duplicate Service", file history of related U.S. Appl. No. 17/488,258, filed Sep. 28, 2021.

Clift et al., "Techniques for ATSC 3.0 Broadcast Boundary Area Management Using Plural Tuners Handing Off Between Presentation and Scanning", file history of related U.S. Appl. No. 17/489,675, filed Sep. 29, 2021.

Clift et al., "Techniques for ATSC 3.0 Broadcast Boundary Area Management Using Plural Tuners with Different Numbers of Antennae", file history of related U.S. Appl. No. 17/489,638, filed Sep. 29, 2021.

Clift et al., Techniques for ATSC 3.0 Broadcast Boundary Area Management Using Plural Tuners:, file history of related U.S. Appl. No. 17/488,274, filed Sep. 28, 2021.

Clift et al., "Techniques for ATSC 3.0 Broadcast Boundary Area Management Using Signal Quality and Packet Errors To Differentiate Between Duplicated Services on Different Frequencies During Scan", file history of related U.S. Appl. No. 17/487,753, filed Sep. 28, 2021.

Clift et al., "Techniques for Receiving Non-Real Time (NRT) Data Whilst Traversing a Multi-Frequency Network Boundary", file history of related U.S. Appl. No. 17/489,694, filed Sep. 29, 2021.

Fay et al., "RF Channel Description for Multiple Frequency Networks", file history of related U.S. Appl. No. 17/525,750, filed Nov. 12, 2021.

Goldberg et al., "ATSC 3 Application Context Switching and Sharing", file history of related U.S. Appl. No. 17/489,708, filed Sep. 29, 2021.

S. -I. Park et al., "ATSC 3.0 Transmitter Identification Signals and Applications," in IEEE Transactions on Broadcasting, vol. 63, No. 1, pp. 240-249, Mar. 2017, doi: 10.1109/TBC.2016.2630268.

Y. T. Abdelrahman, R. A. Saeed and A. El-Tahir, "Multiple Physical Layer Pipes performance for DVB-T2,", 2017 International Conference on Communication, Control, Computing and Electronics Engineering (ICCCCEE), 2017, pp. 1-7, doi: 10.1109/ICCCCEE.2017.7867634.

Clift et al., "Techniques for ATSC 3.0 Broadcast Boundary Area Management Using Plural Tuners Handing Off Between Presentation and Scanning", related U.S. Appl. No. 17/489,675 Non-Final Office Action dated Jul. 28, 2022.

Clift et al., "Techniques for ATSC 3.0 Broadcast Boundary Area Management Using Plural Tuners Handing Off Between Presentation and Scanning", related U.S. Appl. No. 17/489,675, Applicant's response to Non-Final Office Action filed Oct. 10, 2022.

Clift et al., "Techniques for ATSC 3.0 Broadcast Boundary Area Management Using Plural Tuners with Different Numbers of Antennae", related U.S. Appl. No. 17/489,638, Non-Final Office Action dated Jun. 9, 2022.

Clift et al., "Techniques for ATSC 3.0 Broadcast Boundary Area Management Using Plural Tuners with Different Numbers of Antennae", related U.S. Appl. No. 17/489,638, Applicant's response to Non-Final Office Action filed Sep. 8, 2022.

Clift et al., Techniques for ATSC 3.0 Broadcast Boundary Area Management Using Plural Tuners:, related U.S. Appl. No. 17/488,274, Non-Final Office Action dated Jul. 28, 2022.

Clift et al., Techniques for ATSC 3.0 Broadcast Boundary Area Management Using Plural Tuners:, related U.S. Appl. No. 17/488,274, Applicant's response to Non-Final Office Action filed Oct. 10, 2022.

Clift et al., "Techniques for Receiving Non-Real Time (NRT) Data Whilst Traversing a Multi-Frequency Network Boundary", related U.S. Appl. No. 17/489,694, Applicant's response to Non-Final Office Action filed Oct. 10, 2022.

Clift et al., "Techniques for Receiving Non-Real Time (NRT) Data Whilst Traversing a Multi-Frequency Network Boundary", related U.S. Appl. No. 17/489,694, Non-Final Office Action dated Sep. 29, 2022.

Clift et al., "Techniques for ATSC 3.0 Broadcast Boundary Area Management Using Signal Duality and Packet Errors To Differentiate Between Duplicated Services On Different Frequencies During Scan", related U.S. Appl. No. 17/487,753, Non-Final Office Action dated Nov. 16, 2022 (SYP340554US02-1168-991).

* cited by examiner

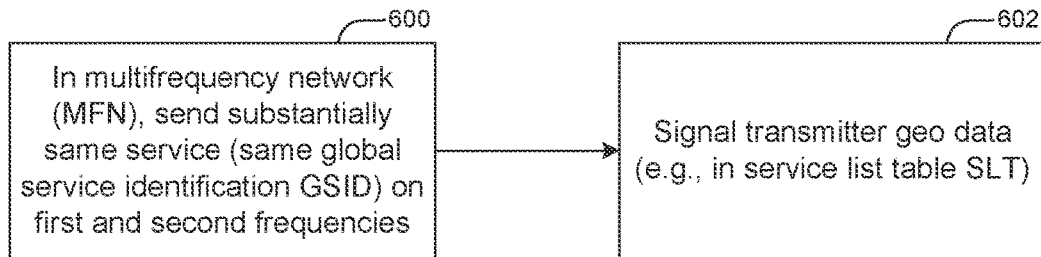
FIG. 6  Transmitter
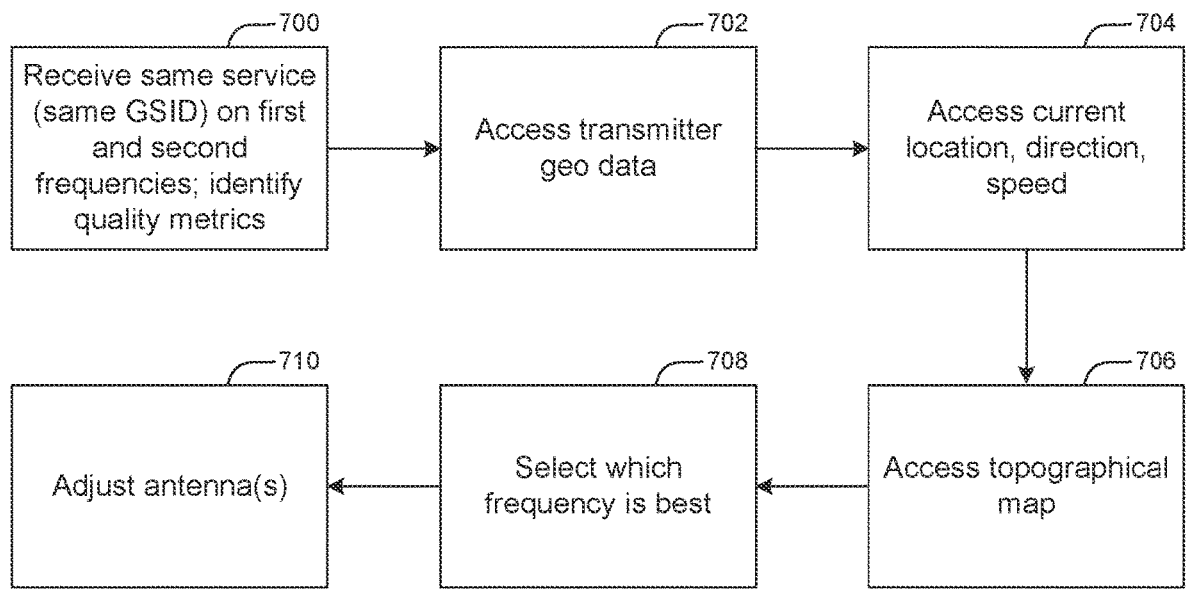
FIG. 7  Receiver

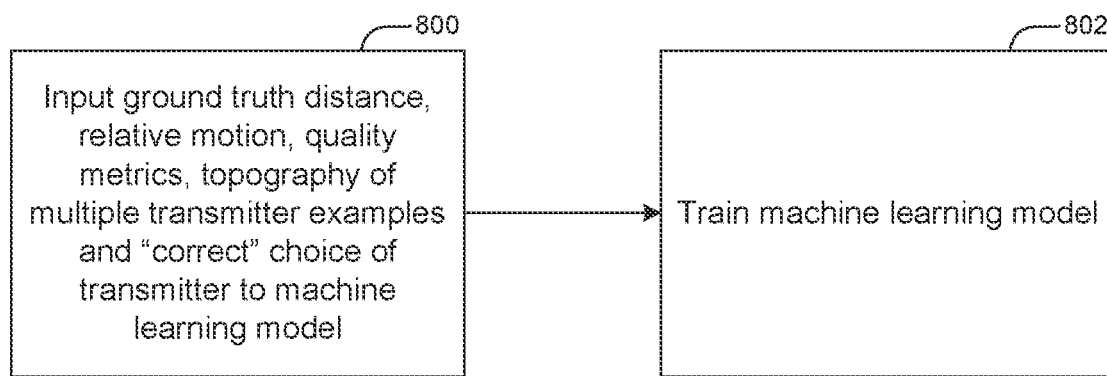
FIG. 8 Train Machine Learning Model

ATSC 3 RECEPTION ACROSS BOUNDARY CONDITIONS USING LOCATION DATA

FIELD

This application relates to technical advances necessarily rooted in computer technology and directed to digital television, and more particularly to Advanced Television Systems Committee (ATSC) 3.0.

BACKGROUND

The Advanced Television Systems Committee (ATSC) 3.0 suite of standards is a set of over a dozen industry technical standards as indicated in A/300 for delivering the next generation of broadcast television. ATSC 3.0 supports delivery of a wide range of television services including televised video, interactive services, non-real time delivery of data, and tailored advertising to a large number of receiving devices, from ultra-high definition televisions to wireless telephones. ATSC 3.0 also orchestrates coordination between broadcast content (referred to as "over the air" or OTA) and related broadband delivered content and services (referred to as "over the top" or OTT). ATSC 3.0 is designed to be flexible so that as technology evolves, advances can be readily incorporated without requiring a complete overhaul of any related technical standard.

As understood herein, an ATSC 3.0 receiver scans for services including in reception areas that contain two or more frequencies carrying the same service, as may occur in a boundary region in which broadcast signals from two regional ATSC 3.0 broadcaster stations overlap. These boundary regions exist in a multifrequency network (MFN).

SUMMARY

As further understood herein, a broadcast digital TV receiver should choose to tune to the RF broadcast which it is able to receive with the strongest, most error-free signal, but this represents a small set of information. Present principles provide techniques for how a receiver can automatically improve and optimize reception based on information about its location, speed, and direction and the transmitter location(s).

Accordingly, in digital television in which at least one receiver can receive broadcast signals, a method includes identifying that a service is received on at least first and second frequencies. The method also includes identifying for each first and second frequency at least first and second respective quality metrics. Further, the method includes identifying at least one parameter selected from: at least one topographical feature in a region in which the receiver is disposed, at least first and second locations of respective first and second transmitters broadcasting the respective first and second frequencies, at least first and second distances between the receiver and the first and second locations of the respective first and second transmitters, at least respective first and second relative motions between the receiver and the respective first and second locations, at least respective first and second elevations of the respective first and second transmitters. The at least one parameter may include any one or more of the above parameters and any combinations thereof. The method includes selecting whether to tune to the first frequency or the second frequency at least in part based on the at least one parameter, and presenting on at least one audio video display device the service received on the first or second frequency as selected based on the at least one parameter.

In some examples the method explicitly includes selecting whether to tune to the first frequency or the second frequency at least in part based on the at least one parameter and based on the first and second quality metrics.

The method may include selecting a frequency at least in part using at least one machine learning (ML) model.

In non-limiting embodiments the method may include altering at least one configuration of at least one antenna based at least in part on which frequency is selected.

In another aspect, an apparatus includes at least one receiver configured to select a first frequency from a first transmitter or a second frequency from a second transmitter. Both frequencies carry substantially the same digital television service. The selection is based at least in part on at least one parameter selected from: at least one topographical feature in a region in which the receiver is disposed, at least first and second locations of the respective first and second transmitters, at least first and second distances between the receiver and the first and second locations of the respective first and second transmitters, at least respective first and second relative motions between the receiver and the respective first and second locations, at least respective first and second elevations of the respective first and second transmitters. The receiver is configured to present on at least one audio video display device the service received on the first or second frequency as selected based on the at least one parameter.

In another aspect, a digital television apparatus includes at least one receiver having at least one processor programmed with instructions to configure the processor to select between a first frequency from a first transmitter and providing a digital television service and a second frequency from a second transmitter and providing the digital television service based at least in part on first and second quality metrics associated with the respective first and second frequencies and at least one geographic parameter related to at least one of the first and second transmitters and/or to a region associated with at least one of the first and second transmitters.

The details of the present application, both as to its structure and operation, can best be understood in reference to the accompanying drawings, in which like reference numerals refer to like parts, and in which:

BRIEF DESCRIPTION OF THE DRAWINGS

FIG. 6 illustrates example transmitter logic in example flow chart format consistent with present principles;

FIG. 7 illustrates example receiver logic in example flow chart format consistent with present principles; and FIG. 8 illustrates logic for training a machine learning (ML) model in example flow chart format consistent with present principles.

DETAILED DESCRIPTION

Figure 1:
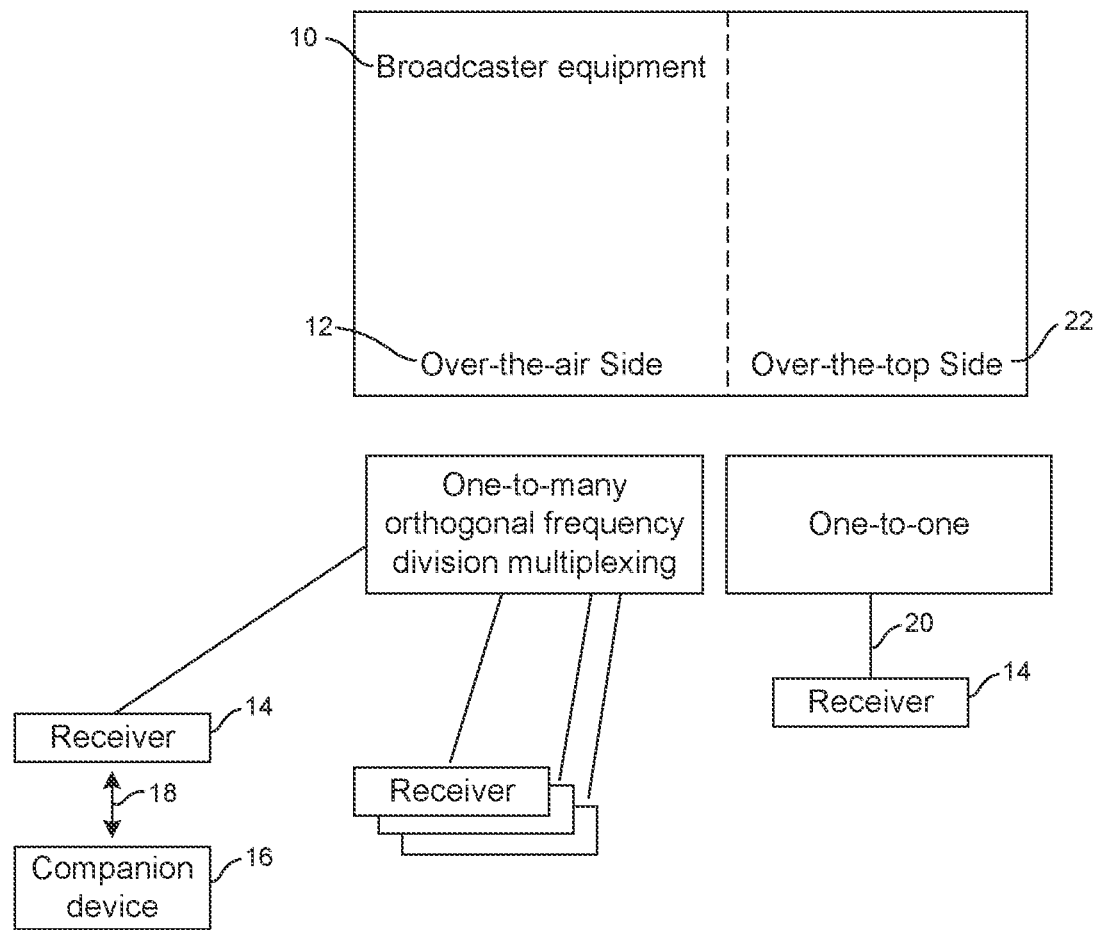
FIG. 1 illustrates an Advanced Television Systems Committee (ATSC) 3.0 system.

This disclosure relates to technical advances in digital television such as in Advanced Television Systems Committee (ATSC) 3.0 television. An example system herein may include ATSC 3.0 source components and client components, connected via broadcast and/or over a network such that data may be exchanged between the client and ATSC 3.0 source components. The client components may include one or more computing devices including portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google, such as Android®. These operating environments may be used to execute one or more browsing programs, such as a browser made by Microsoft or Google or Mozilla or other browser program that can access websites hosted by the Internet servers discussed below.

ATSC 3.0 publication A/344, incorporated herein by reference, may be particularly relevant to techniques described herein.

ATSC 3.0 source components may include broadcast transmission components and servers and/or gateways that may include one or more processors executing instructions that configure the source components to broadcast data and/or to transmit data over a network such as the Internet. A client component and/or a local ATSC 3.0 source component may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security.

As used herein, instructions refer to computer-implemented steps for processing information in the system. Instructions can be implemented in software, firmware or hardware and include any type of programmed step undertaken by components of the system.

A processor may be a single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library. While flow chart format may be used, it is to be understood that software may be implemented as a state machine or other logical method.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to hypertext markup language (HTML)-5, Java/Javascript, C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable universal serial bus (USB) thumb drives, etc. A connection may establish a computer-readable medium. Such connections can include, as examples, hard-wired cables including fiber optics and coaxial wires and digital subscriber line (DSL) and twisted pair wires.

Components included in one embodiment can be used in other embodiments in any appropriate combination. For example, any of the various components described herein and/or depicted in the Figures may be combined, interchanged or excluded from other embodiments.

A recitation of "having at least one of A, B, and C" (likewise "having at least one of A, B, or C" and "having at least one of A, B, C") includes alone, B alone, C alone, A and B together, A and C together, B and C together, and/or A, B, and C together, etc.

Present principles may employ various machine learning models, including deep learning models. Machine learning models consistent with present principles may use various algorithms trained in ways that include supervised learning, unsupervised learning, semi-supervised learning, reinforcement learning, feature learning, self-learning, and other forms of learning. Examples of such algorithms, which can be implemented by computer circuitry, include one or more neural networks, such as a convolutional neural network (CNN), a recurrent neural network (RNN), and a type of RNN known as a long short-term memory (LSTM) network. Support vector machines (SVM) and Bayesian networks also may be considered to be examples of machine learning models.

As understood herein, performing machine learning may therefore involve accessing and then training a model on training data to enable the model to process further data to make inferences. An artificial neural network/artificial intelligence model trained through machine learning may thus include an input layer, an output layer, and multiple hidden layers in between that that are configured and weighted to make inferences about an appropriate output.

Turning to FIG. 1, an example of an ATSC 3.0 source component is labeled "broadcaster equipment" 10 and may include over-the-air (OTA) equipment 12 for wirelessly broadcasting, typically via orthogonal frequency division multiplexing (OFDM) in a one-to-many relationship, television data to plural receivers 14 such as ATSC 3.0 televisions. One or more receivers 14 may communicate with one or more companion devices 16 such as remote controls, tablet computers, mobile telephones, and the like over a short range, typically wireless link 18 that may be implemented by Bluetooth®, low energy Bluetooth, other near field communication (NFC) protocol, infrared (IR), etc.

Also, one or more of the receivers 14 may communicate, via a wired and/or wireless network link 20 such as the Internet, with over-the-top (OTT) equipment 22 of the broadcaster equipment 10 typically in a one-to-one relationship. The OTA equipment 12 may be co-located with the OTT equipment 22 or the two sides 12, 22 of the broadcaster equipment 10 may be remote from each other and may communicate with each other through appropriate means. In any case, a receiver 14 may receive ATSC 3.0 television signals OTA over a tuned-to ATSC 3.0 television channel and may also receive related content, including television, OTT (broadband). Note that computerized devices described in all of the figures herein may include some or all of the components set forth for various devices in FIGS. 1 and 2.

Figure 2:
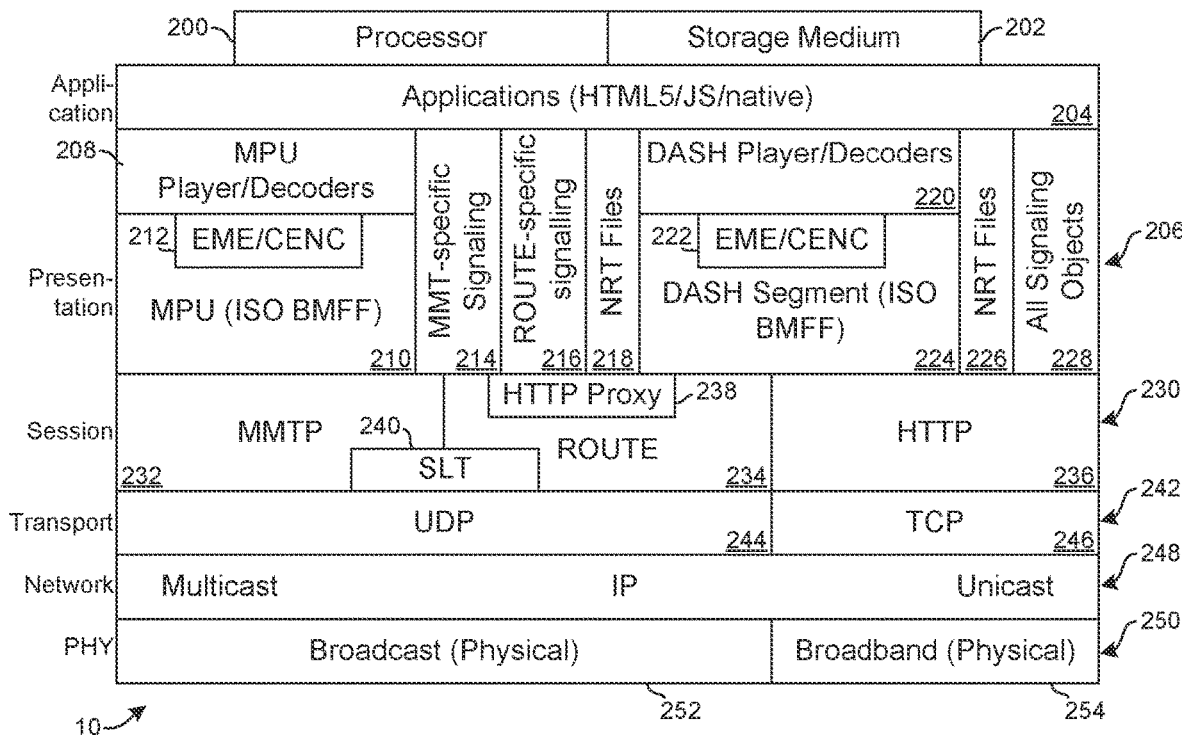
FIG. 2 illustrates components of the devices shown in FIG. 1.
Figure 2:
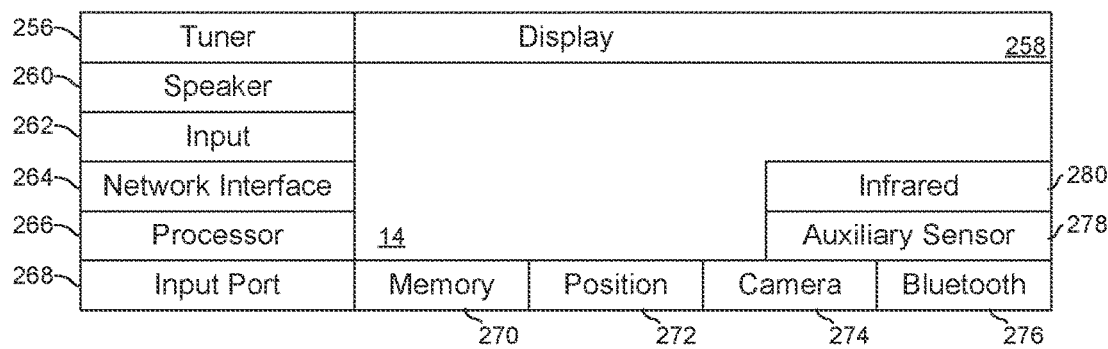

Referring now to FIG. 2, details of examples of components shown in FIG. 1 may be seen. FIG. 2 illustrates an example protocol stack that may be implemented by a combination of hardware and software. Using the ATSC 3.0 protocol stack shown in FIG. 2 and modified as appropriate for the broadcaster side, broadcasters can send hybrid service delivery in which one or more program elements are delivered via a computer network (referred to herein as "broadband" and "over-the-top" (OTT)) as well as via a wireless broadcast (referred to herein as "broadcast" and "over-the-air" (OTA)). FIG. 2 also illustrates an example stack with hardware that may be embodied by a receiver.

Disclosing FIG. 2 in terms of broadcaster equipment 10, one or more processors 200 accessing one or more computer storage media 202 such as any memories or storages described herein may be implemented to provide one or more software applications in a top-level application layer 204. The application layer 204 can include one or more software applications written in, e.g., HTML5/Javascript running in a runtime environment. Without limitation, the applications in the application stack 204 may include linear TV applications, interactive service applications, companion screen applications, personalization applications, emergency alert applications, and usage reporting applications. The applications typically are embodied in software that represents the elements that the viewer experiences, including video coding, audio coding and the run-time environment. As an example, an application may be provided that enables a user to control dialog, use alternate audio tracks, control audio parameters such as normalization and dynamic range, and so on.

Below the application layer 204 is a presentation layer 206. The presentation layer 206 includes, on the broadcast (OTA) side, broadcast audio-video playback devices referred to as Media Processing Units (MPU) 208 that, when implemented in a receiver, decode and playback, on one or more displays and speakers, wirelessly broadcast audio video content. The MPU 208 is configured to present International Organization for Standardization (ISO) base media file format (BMFF) data representations 210 and video in high efficiency video coding (HEVC) with audio in, e.g., Dolby audio compression (AC-4) format. ISO BMFF is a general file structure for time-based media files broken into "segments" and presentation metadata. Each of the files is essentially a collection of nested objects each with a type and a length. To facilitate decryption, the MPU 208 may access a broadcast side encrypted media extension (EME)/common encryption (CENC) module 212.

FIG. 2 further illustrates that on the broadcast side the presentation layer 206 may include signaling modules, including either motion pictures expert group (MPEG) media transport protocol (MMTP) signaling module 214 or real-time object delivery over unidirectional transport (ROUTE) signaling module 216 for delivering non-real time (NRT) content 218 that is accessible to the application layer 204. NRT content may include but is not limited to stored replacement advertisements.

On the broadband (OTT or computer network) side, when implemented by a receiver the presentation layer 206 can include one or more dynamic adaptive streaming over hypertext transfer protocol (HTTP) (DASH) player/decoders 220 for decoding and playing audio-video content from the Internet. To this end the DASH player 220 may access a broadband side EME/CENC module 222. The DASH content may be provided as DASH segments 224 in ISO/BMFF format.

As was the case for the broadcast side, the broadband side of the presentation layer 206 may include NRT content in files 226 and may also include signaling objects 228 for providing play back signaling.

Below the presentation layer 206 in the protocol stack is a session layer 230. The session layer 230 includes, on the broadcast side, either MMTP protocol 232 or ROUTE protocol 234. Note that the ATSC standard provides an option to use MPEG MMT for transport, though it is not shown here.

On the broadband side the session layer 230 includes HTTP protocol 236 which may be implemented as HTTP-secure (HTTP(S)). The broadcast side of the session layer 230 also may employ a HTTP proxy module 238 and a service list table (SLT) 240. The SLT 240 includes a table of signaling information which is used to build a basic service listing and provide bootstrap discovery of the broadcast content. Media presentation descriptions (MPD) are included in the "ROUTE Signaling" tables delivered over user datagram protocol (UDP) by the ROUTE transport protocol.

A transport layer 242 is below the session layer 230 in the protocol stack for establishing low-latency and loss-tolerating connections. On the broadcast side the transport layer 242 uses (UDP 244 and on the broadband side transmission control protocol (TCP) 246.

The example non-limiting protocol stack shown in FIG. 2 also includes a network layer 248 below the transport layer 242. The network layer 248 uses Internet protocol (IP) on both sides for IP packet communication, with multicast delivery being typical on the broadcast side and unicast being typical on the broadband side.

Below the network layer 248 is the physical layer 250 which includes broadcast transmission/receive equipment 252 and computer network interface(s) 254 for communicating on the respective physical media associated with the two sides. The physical layer 250 converts Internet Protocol (IP) packets to be suitable to be transported over the relevant medium and may add forward error correction functionality to enable error correction at the receiver as well as contain modulation and demodulation modules to incorporate modulation and demodulation functionalities. This converts bits into symbols for long distance transmission as well as to increase bandwidth efficiency. On the OTA side the physical layer 250 typically includes a wireless broadcast transmitter to broadcast data wirelessly using orthogonal frequency division multiplexing (OFDM) while on the OTT side the physical layer 250 includes computer transmission components to send data over the Internet.

A DASH Industry Forum (DASH-IF) profile sent through the various protocols (HTTP/TCP/IP) in the protocol stack may be used on the broadband side. Media files in the DASH-IF profile based on the ISO BMFF may be used as the delivery, media encapsulation and synchronization format for both broadcast and broadband delivery.

Each receiver 14 typically includes a protocol stack that is complementary to that of the broadcaster equipment.

A receiver 14 in FIG. 1 may include, as shown in FIG. 2, an Internet-enabled TV with an ATSC 3.0 TV tuner (equivalently, set top box controlling a TV) 256. The receiver 14 may be an Android®-based system. The receiver 14 alternatively may be implemented by a computerized Internet enabled ("smart") telephone, a tablet computer, a notebook computer, a wearable computerized device, and so on. Regardless, it is to be understood that the receiver 14 and/or other computers described herein is configured to undertake present principles (e.g. communicate with other devices to undertake present principles, execute the logic described herein, and perform any other functions and/or operations described herein).

Accordingly, to undertake such principles the receiver 14 can be established by some or all of the components shown in FIG. 1. For example, the receiver 14 can include one or more displays 258 that may be implemented by a high definition or ultra-high definition "4K" or higher flat screen and that may or may not be touch-enabled for receiving user input signals via touches on the display. The receiver 14 may also include one or more speakers 260 for outputting audio in accordance with present principles, and at least one additional input device 262 such as, e.g., an audio receiver/microphone for, e.g., entering audible commands to the receiver 14 to control the receiver 14. The example receiver 14 may further include one or more network interfaces 264 for communication over at least one network such as the Internet, a WAN, a LAN, a PAN etc. under control of one or more processors 266. Thus, the interface 264 may be, without limitation, a Wi-Fi transceiver, which is an example of a wireless computer network interface, such as but not limited to a mesh network transceiver. The interface 264 may be, without limitation, a Bluetooth® transceiver, Zigbee® transceiver, Infrared Data Association (IrDA) transceiver, Wireless USB transceiver, wired USB, wired LAN, Powerline or Multimedia over Coax Alliance (MoCA). It is to be understood that the processor 266 controls the receiver 14 to undertake present principles, including the other elements of the receiver 14 described herein such as, for instance, controlling the display 258 to present images thereon and receiving input therefrom. Furthermore, note the network interface 264 may be, e.g., a wired or wireless modem or router, or other appropriate interface such as, e.g., a wireless telephony transceiver, or Wi-Fi transceiver as mentioned above, etc.

In addition to the foregoing, the receiver 14 may also include one or more input ports 268 such as a high definition multimedia interface (HDMI) port or a USB port to physically connect (using a wired connection) to another CE device and/or a headphone port to connect headphones to the receiver 14 for presentation of audio from the receiver 14 to a user through the headphones. For example, the input port 268 may be connected via wire or wirelessly to a cable or satellite source of audio video content. Thus, the source may be a separate or integrated set top box, or a satellite receiver. Or, the source may be a game console or disk player.

The receiver 14 may further include one or more computer memories 270 such as disk-based or solid-state storage that are not transitory signals, in some cases embodied in the chassis of the receiver as standalone devices or as a personal video recording device (PVR) or video disk player either internal or external to the chassis of the receiver for playing back audio video (AV) programs or as removable memory media. Also, in some embodiments, the receiver 14 can include a position or location receiver 272 such as but not limited to a cellphone receiver, global positioning satellite (GPS) receiver, and/or altimeter that is configured to e.g. receive geographic position information from at least one satellite or cellphone tower and provide the information to the processor 266 and/or determine an altitude at which the receiver 14 is disposed in conjunction with the processor 266. However, it is to be understood that that another suitable position receiver other than a cellphone receiver, GPS receiver and/or altimeter may be used in accordance with present principles to determine the location of the receiver 14 in e.g. all three dimensions.

Continuing the description of the receiver 14, in some embodiments the receiver 14 may include one or more cameras 274 that may include one or more of a thermal imaging camera, a digital camera such as a webcam, and/or a camera integrated into the receiver 14 and controllable by the processor 266 to gather pictures/images and/or video in accordance with present principles. Also included on the receiver 14 may be a Bluetooth® transceiver 276 or other Near Field Communication (NFC) element for communication with other devices using Bluetooth® and/or NFC technology, respectively. An example NFC element can be a radio frequency identification (RFID) element.

Further still, the receiver 14 may include one or more auxiliary sensors 278 (such as a motion sensor such as an accelerometer, gyroscope, cyclometer, or a magnetic sensor and combinations thereof), an infrared (IR) sensor for receiving IR commands from a remote control, an optical sensor, a speed and/or cadence sensor, a gesture sensor (for sensing gesture commands) and so on providing input to the processor 266. An IR sensor 280 may be provided to receive commands from a wireless remote control. A battery (not shown) may be provided for powering the receiver 14.

The companion device 16 may incorporate some or all of the elements shown in relation to the receiver 14 described above.

The methods described herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a CD ROM or Flash drive. The software code instructions may alternatively be embodied in a transitory arrangement such as a radio or optical signal, or via a download over the Internet.

Figure 3:
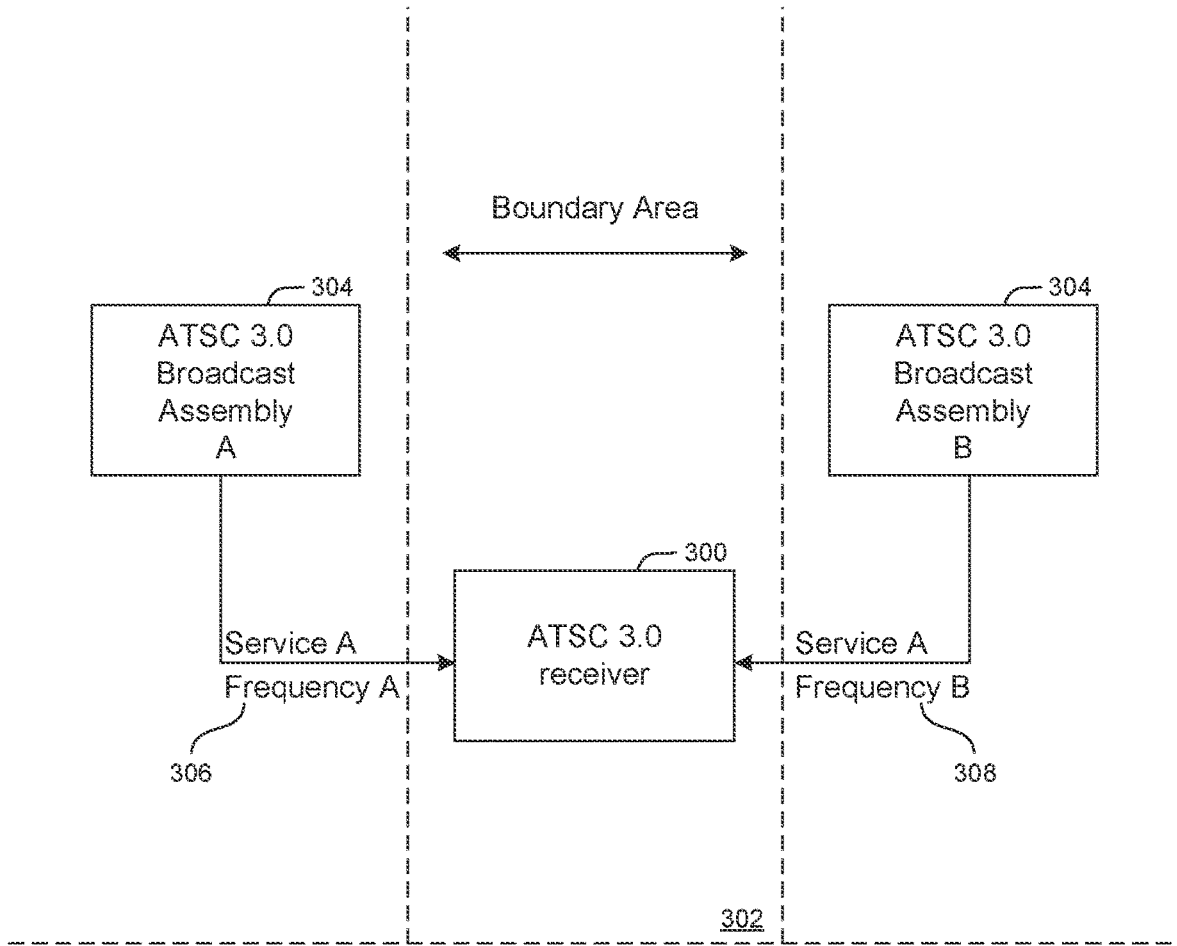
FIG. 3 illustrates an example specific system.

Now referring to FIG. 3, a simplified digital TV system such as an ATSC 3.0 system is shown. In FIG. 3, a mobile or stationary digital TV receiver such as an ATSC 3.0 receiver 300 that may include any or all of the relevant components discussed above in relation to FIGS. 1 and 2 is located in a boundary region 302 between first and second ATSC 3.0 broadcast stations or assemblies 304, with signals from both broadcast stations 304 being picked up by the receiver 300 in the region 302. A first ATSC 3.0 service ("Service A") is broadcast from the first broadcast station 304 over a first frequency 306, whereas the same service A is broadcast from the second broadcast station 304 over a second frequency 308 different from the first frequency 306. The receiver 300 picks up both frequencies, i.e., the receiver 300 picks up signals from both broadcast stations 304.

Figure 4:
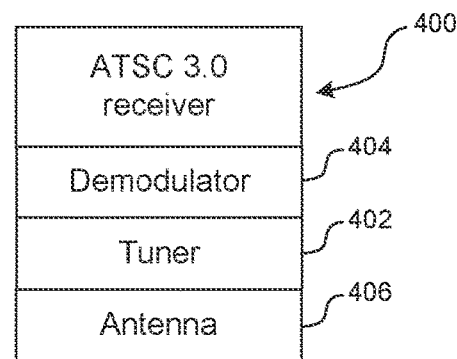
FIG. 4 illustrates a first example embodiment of a digital TV receiver.

FIG. 4 illustrates an example non-limiting embodiment of a digital TV receiver such as an ATSC 3.0 receiver 400 that may include any or all of the relevant components discussed above in relation to FIGS. 1 and 2. In the example shown, the ATSC 3.0 receiver 400 may be a stationary receiver, e.g., a receiver located inside a home. In some examples, the ATSC 3.0 receiver 400 may be a mobile receiver, e.g., as by being implemented in a mobile phone or being disposed in a moving vehicle.

The example ATSC 3.0 receiver 400 shown in FIG. 4 includes a tuner 402 sending signals to a demodulator 404 that the tuner picks up from one or more antennae 406. In the example shown, the receiver 400 includes one and only one tuner, one and only one demodulator, and one and only one antenna.

Figure 5:
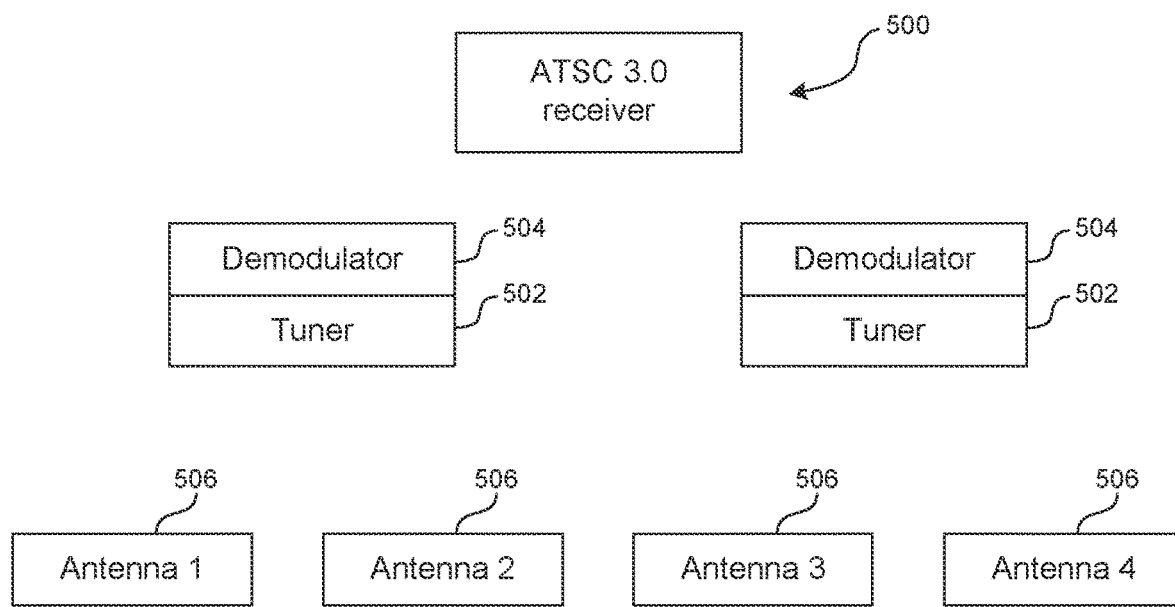
FIG. 5 illustrates a second example embodiment of a digital TV receiver.

In contrast, FIG. 5 illustrates an example non-limiting embodiment of a digital TV receiver such as an ATSC 3.0 receiver 500 that may include any or all of the relevant components discussed above in relation to FIGS. 1 and 2. In the example shown, the ATSC 3.0 receiver 500 may be a mobile receiver, e.g., as by being implemented in a mobile phone or being disposed in a moving vehicle. In some examples, the ATSC 3.0 receiver 500 may be a stationary receiver, e.g., a receiver located inside a home.

The example ATSC 3.0 receiver 500 shown in FIG. 5 includes plural tuners 502 sending signals to respective demodulators 504 picked up by the tuners from one or more antennae 506. In the non-limiting example shown, the ATSC 3.0 receiver 500 has two tuners and two demodulators, it being understood that the receiver may have a greater or lesser number of tuner/demodulators. In the non-limiting example shown, the ATSC 3.0 receiver 500 has four antennae, it being understood that the receiver may have a greater or lesser number of antennae. The receiver 500 may have the capability to switch antennae input to the tuners, such that a first tuner may receive signals from, e.g., three antennae and a second tuner may receive signals from the fourth antenna, and then a switch may be made to swap antenna input between the tuners. Two antennae may provide input to each respective tuner. All four antennae may provide input to a single tuner. These and other antenna-tuner configurations can be changed on the fly during operation as needed.

Quality metrics of RF frequencies are discussed herein, and may be identified and stored. The quality metrics can include, e.g., signal to noise ratio (SNR) and error rate as may be represented by, e.g., packet error number (PEN). The quality metrics can include resolution, e.g., whether a service is in high definition (HD) or standard definition (SD). The quality metric also can include bit-rate and form-factor, recognizing that not all HD is the same. The quality metrics can include content attributes such as whether a service supports foreign languages, accessibility signaling (e.g. where signing is being done), audio description, and other content aspects. The quality metrics can include locality preference (such as a first region channel being strong, but all the ads are for the first region and not a second region preferred by the user so that a duplicate service from the second region may be accorded preference over the first region). The quality metrics can include quality of user interfaces carried in the service.

In non-limiting examples SNR may be determined during the scan by noting both the received signal strength of each received frequency and any accompanying noise on that frequency and determining the quotient thereof. Error rate may be determined by, e.g., determining a percentage of packets missed (by noting missing packet numbers) and/or by determining a percentage of received packets with errors in them as determined by error correction algorithms.

FIG. 6 illustrates logic executable by a transmitter such as an OTA transmitter or OTT transmitter. When an ATSC 3.0 receiver, particularly (but not limited to) a mobile device encounters a set of two or more RF broadcasts where two or more RF broadcasts include programming which is identified as substantially the same (for example, by having identical globalServiceId values). The receiver should choose to tune to the RF broadcast which it is able to receive with the strongest, most error-free signal. Absent present principles, a receiver must choose based on only signal strength or error rates encountered at the current time or in the past.

Indeed, present principles enables a receiver to choose the best RF broadcast to tune to based on information of the receiver's location, direction and speed of travel, transmitter locations, topographical features of the receiver and transmitter locations. For example, if encountering two equivalent signals while traveling in the direction of one of those signals, a receiver should probably tune to the transmission it is moving toward. On the other hand, if there is a topographical feature (like a mountain) which will decrease the signal quality if the receiver continues at its current heading and speed, then the receiver might choose to tune to a broadcast not subject to the signal quality issues due to the mountain until after the mountain is no longer affecting the signal quality. Note that a light direction and ranging (LIDAR) apparatus associated with, e.g., the receiver may be used to generate a topographical map.

Additionally, using information described above, a receiver can utilize the above information (particularly transmitter locations and receiver location) to automatically adjust antenna configuration to maximize reception (for example, by controlling an antenna rotator, or an antenna's beamforming capabilities).

Also, a machine learning (ML) model process can utilize the above information to predict the best reception parameters (antenna configuration) and best transmission to tune to in a more-accurate more-efficient way.

Accordingly, turn now to FIG. 6. Commencing at block 600, in a MFN such as an ATSC 3 broadcast network, two or more transmitters, which may be wireless broadcast transmitters and/or broadband transmitters, send substantially the same digital TV service at substantially the same time, albeit in the case of broadcasters on different frequencies if desired. "Substantially the same service" in some embodiments can refer to two duplicate versions of the same service having the same global service identifier (GSID), which refers to the attribute @globalServiceID in table 6.2 (SLT) of A/331. "Substantially the same service" in some embodiments can refer to two duplicate versions of the same service having the same broadcast stream identification (BSID). "Substantially the same service" in some embodiments can refer to a service that is an acceptable replacement for the service being replaced, for example, services in which signaling indicates a second service is a replacement or equivalent for a first service.

Proceeding to block 602, each transmitter can signal its respective geo location data, e.g., latitude, longitude, elevation. This signaling may be inserted into a SLT.

FIG. 7 illustrates receiver side logic. Commencing at block 700, particularly when in a boundary region in which signals from two adjacent transmitters in adjacent broadcast regions overlap, a receiver might receive substantially the same service on two different frequencies from the respective broadcaster transmitters as indicated by, e.g., having the same GSID or BSID. One or more quality metrics of each received frequency may be determined. However, instead of relying only on channel quality to select which frequency to use to present the service, the logic may move to block 702 to access, for each transmitter, its geo location data as received in, for instance, the SLT from the transmitter.

Further, at block 704 the receiver may access its own current location and if moving speed and direction of movement using signals from a location sensor such as the location receiver 272 in FIG. 2. The receiver may further access a topographical map at block 706. Based not only on the quality metrics but also on the receiver distance and direction/speed of motion relative to each transmitter, as well as, if desired, topographical information, a frequency is selected at block 708 to use to present a service being carried on two or more frequencies. If the receiver antenna(s) can be moved, they may be moved or otherwise reconfigured at block 710 to maximize reception from the transmitter associated with the selected frequency. The service from the selected frequency is presented on an audio video display device associated with the receiver.

For example, in some embodiments, a first frequency with better quality metrics than a second frequency may be selected when the receiver is stationary.

A first frequency with better quality metrics than a second frequency may be selected when the receiver is stationary and no topographical obstructions lie between the receiver and the transmitter sending the service on the first frequency.

In some embodiments a first frequency with lower quality metrics than a second frequency may be selected when the receiver is stationary and at least one topographical obstruction lies between the receiver and the transmitter sending the service on the first frequency.

In some embodiments a first frequency with better quality metrics than a second frequency by a significant amount, such as an SNR differential above a threshold, may be selected when the receiver is stationary and at least one topographical obstruction lies between the receiver and the transmitter sending the service on the first frequency.

In some embodiments a first frequency with lower quality metrics than a second frequency may be selected when the receiver is moving toward the transmitter sending the service on the first frequency.

In some embodiments a first frequency with lower quality metrics than a second frequency may be selected only if the receiver is moving toward the transmitter sending the service on the first frequency by at least a threshold velocity.

In some embodiments a first frequency with lower quality metrics than a second frequency may be selected only if the receiver is moving toward the transmitter sending the service on the first frequency and no obstructions exist between the receiver and the transmitter.

In some embodiments a first frequency with lower quality metrics than a second frequency may be selected only if the receiver is moving toward the transmitter sending the service on the first frequency and an obstruction exists between the receiver and the transmitter sending the service on the second frequency.

In some embodiments a first frequency with lower quality metrics than a second frequency may be selected if the receiver is moving toward the transmitter sending the service on the first frequency, an obstruction exists between the receiver and the transmitter sending the service on the first frequency, but the elevation of the transmitter sending the service on the first frequency is higher than the obstruction.

These are but some example heuristics that may be used to select a frequency.

Selection may be accomplished using at least one ML model which may be trained starting at block 800 in FIG. 8. Ground truth is input to the ML model. The ground truth may include latitudes, longitudes, and elevations of actual digital TV broadcaster transmitters, superimposed on a topographical map of the surrounding environs. The ground truth may include these features only for a region, or for a nation, or for the entire globe.

The ground truth also may include plural hypothetical receiver locations, courses, and speeds along with hypothetical signal quality metrics or quality metrics actually measured at the locations by test vehicles. The ground may include an indication of which of two frequencies is the best selection at each hypothetical receiver location. The ML model is trained at block 802 based on the ground truth input at block 800, for subsequent use in receivers executing the Ml model.

It will be appreciated that whilst present principals have been described with reference to some example embodiments, these are not intended to be limiting, and that various alternative arrangements may be used to implement the subject matter claimed herein.

What is claimed is:

1. In digital television in which at least one receiver can receive broadcast signals from at least first and second digital television broadcast assemblies, a method, comprising:
   identifying that a service is received on at least first and second frequencies;
   identifying for each first and second frequency at least first and second respective quality metrics;
   identifying at least one parameter selected from: at least one topographical feature in a region in which the receiver is disposed, at least first and second locations of respective first and second transmitters broadcasting the respective first and second frequencies, at least first and second distances between the receiver and the first and second locations of the respective first and second transmitters, at least respective first and second relative motions between the receiver and the respective first and second locations, at least respective first and second elevations of the respective first and second transmitters;
   selecting whether to tune to the first frequency or the second frequency at least in part based on the at least one parameter; and
   presenting on at least one audio video display device the service received on the first or second frequency as selected based on the at least one parameter.

2. The method of claim 1, wherein the digital television receiver comprises an advanced television systems committee (ATSC) 3.0 receiver.

3. The method of claim 1, comprising selecting whether to tune to the first frequency or the second frequency at least in part based on the at least one parameter and based on the first and second quality metrics.

4. The method of claim 1, comprising selecting whether to tune to the first frequency or the second frequency at least in part based on at least one topographical feature in a region in which the receiver is disposed.

5. The method of claim 1, comprising selecting whether to tune to the first frequency or the second frequency at least in part based on at least the first and second locations of the respective first and second transmitters broadcasting the respective first and second frequencies.

6. The method of claim 1, comprising selecting whether to tune to the first frequency or the second frequency at least in part based on at least the first and second distances between the receiver and the first and second locations of the respective first and second transmitters.

7. The method of claim 1, comprising selecting whether to tune to the first frequency or the second frequency at least in part based on at least the respective first and second directions of travel between the receiver and the respective first and second locations.

8. The method of claim 1, comprising selecting whether to tune to the first frequency or the second frequency at least in part based on at least the respective first and second elevations of the respective first and second transmitters.

9. The method of claim 1, comprising selecting a frequency at least in part using at least one machine learning (ML) model.

10. The method of claim 1, comprising altering at least one configuration of at least one antenna based at least in part on which frequency is selected.

11. An apparatus comprising:
at least one receiver configured to:
select a first frequency from a first transmitter or a second frequency from a second transmitter, both frequencies carrying substantially the same digital television service, based at least in part on at least one parameter selected from: at least one topographical feature in a region in which the receiver is disposed, at least first and second locations of the respective first and second transmitters, at least first and second distances between the receiver and the first and second locations of the respective first and second transmitters, at least respective first and second relative motions between the receiver and the respective first and second locations, at least respective first and second elevations of the respective first and second transmitters; and
present on at least one audio video display device the service received on the first or second frequency as selected based on the at least one parameter.

12. The apparatus of claim 11, wherein the receiver is configured to:
identify for each first and second frequency at least first and second respective quality metrics; and
select whether to tune to the first frequency or the second frequency at least in part based on the at least one parameter and based on the first and second quality metrics.

13. The apparatus of claim 11, wherein the receiver is configured to select whether to tune to the first frequency or the second frequency at least in part based on at least one topographical feature in a region in which the receiver is disposed.

14. The apparatus of claim 11, wherein the receiver is configured executable to select whether to tune to the first frequency or the second frequency at least in part based on at least the first and second locations of the respective first and second transmitters broadcasting the respective first and second frequencies.

15. The apparatus of claim 11, wherein the receiver is configured to select whether to tune to the first frequency or the second frequency at least in part based on at least the first and second distances between the receiver and the first and second locations of the respective first and second transmitters.

16. The apparatus of claim 11, wherein the receiver is configured to select whether to tune to the first frequency or the second frequency at least in part based on at least the respective first and second directions of travel between the receiver and the respective first and second locations.

17. The apparatus of claim 11, wherein the receiver is configured to select whether to tune to the first frequency or the second frequency at least in part based on at least the respective first and second elevations of the respective first and second transmitters.

18. A digital television apparatus comprising:
at least one receiver comprising at least one processor programmed with instructions to configure the processor to:
select between a first frequency from a first transmitter and providing a digital television service and a second frequency from a second transmitter and providing the digital television service based at least in part on first and second quality metrics associated with the respective first and second frequencies and at least one geographic parameter related to at least one of the first and second transmitters and/or to a region associated with at least one of the first and second transmitters.

19. The digital television apparatus of claim 18, wherein the instructions are executable to select between the first frequency from the first transmitter providing the digital television service and the second frequency from the second transmitter providing the digital television service based at least in part on the first and second quality metrics associated with the respective first and second frequencies and at least one geographic parameter related to at least one of the first and second transmitters, wherein
at least one geographic parameter is selected from: at least one topographical feature in a region in which the receiver is disposed, at least first and second locations of the respective first and second transmitters, at least first and second distances between the receiver and the first and second locations of the respective first and second transmitters, at least respective first and second directions of travel between the receiver and the respective first and second locations, at least respective first and second elevations of the respective first and second transmitters.

20. The digital television apparatus of claim 18, wherein the instructions are executable to execute at least one machine learning (ML) model to select a frequency.

21. The digital television apparatus of claim 18, wherein the instructions are executable to select between the first frequency from the first transmitter providing the digital television service and the second frequency from the second transmitter providing the digital television service based at least in part on the first and second quality metrics associated with the respective first and second frequencies and a region associated with at least one of the first and second transmitters.

* * * * *